June 11, 1957 A. L. LEE Re. 24,327

HYDRAULICALLY CONTROLLED TRANSMISSION

Original Filed Jan. 31, 1951 6 Sheets-Sheet 1

Inventor:
Arthur L. Lee.

By D. Leigh Fowler, Jr.
Attorney.

HYDRAULICALLY CONTROLLED TRANSMISSION

Original Filed Jan. 31, 1951 6 Sheets-Sheet 2

Inventor:
Arthur L. Lee.
By D. Leigh Fowler, Jr.
Attorney.

HYDRAULICALLY CONTROLLED TRANSMISSION

Original Filed Jan. 31, 1951 6 Sheets-Sheet 3

Inventor:
Arthur L. Lee.
By D. Leigh Fowler, Jr.
Attorney.

HYDRAULICALLY CONTROLLED TRANSMISSION

Original Filed Jan. 31, 1951 6 Sheets-Sheet 4

Inventor:
Arthur L. Lee.
By D. Leigh Fowler, Jr.
Attorney.

HYDRAULICALLY CONTROLLED TRANSMISSION

Original Filed Jan. 31, 1951 6 Sheets-Sheet 5

Inventor:
Arthur L. Lee.
By D. Leigh Fowler, Jr.
Attorney

HYDRAULICALLY CONTROLLED TRANSMISSION
Original Filed Jan. 31, 1951 6 Sheets-Sheet 6
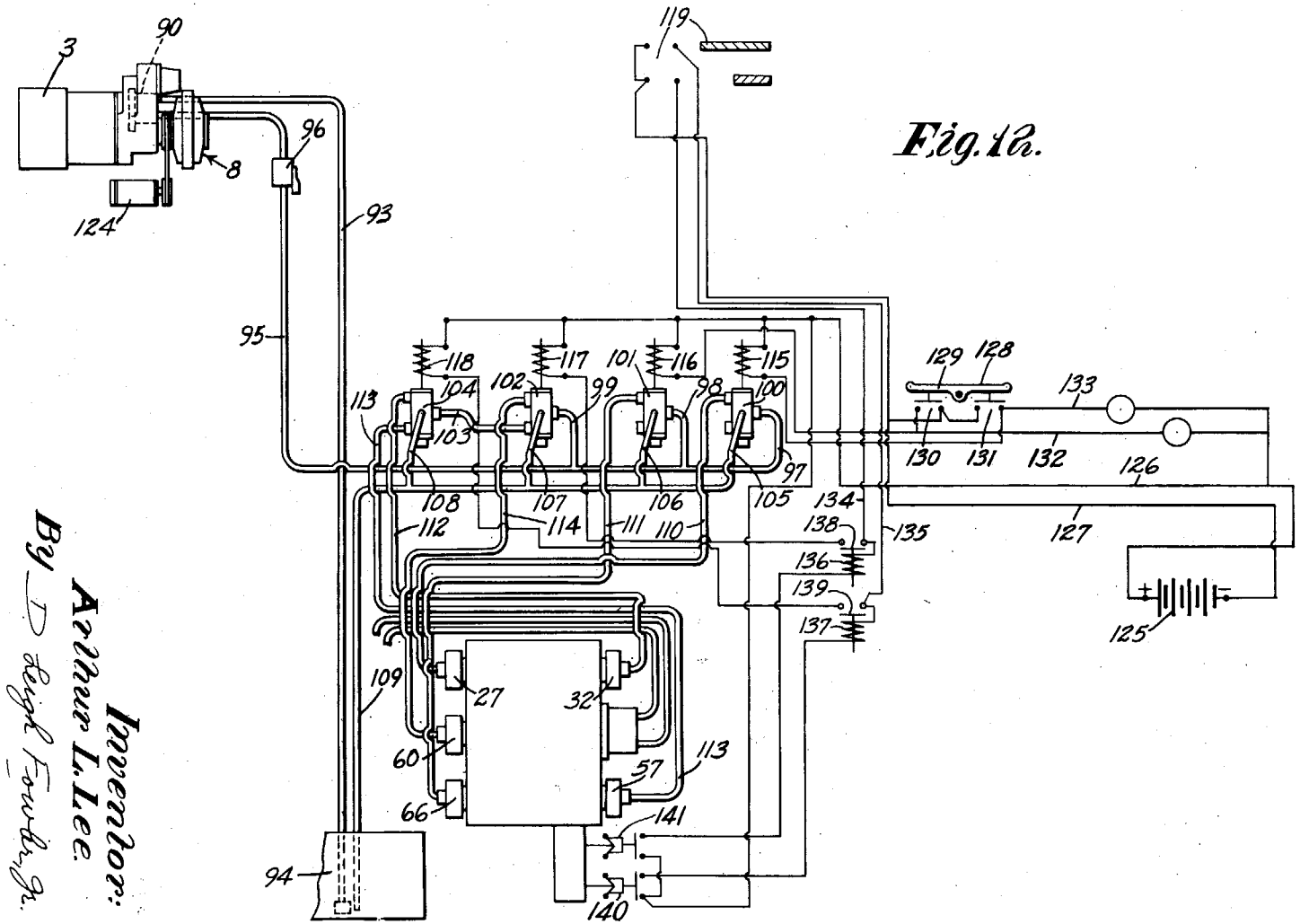
Inventor:
Arthur L. Lee.
By D. Leigh Fowler, Jr.
Attorney.

United States Patent Office

Re. 24,327
Reissued June 11, 1957

24,327

HYDRAULICALLY CONTROLLED TRANSMISSION

Arthur L. Lee, Columbus, Ohio, assignor to Pittsburgh Consolidation Coal Company, Pittsburgh, Pa., a corporation of Pennsylvania Original No. 2,712,245, dated July 5, 1955, Serial No. 208,680, January 31, 1951. Application for reissue August 9, 1956, Serial No. 603,203

28 Claims. (Cl. 74—360)

Matter enclosed in heavy brackets [ ] appears in the original patent but forms no part of this reissue specification; matter printed in italics indicates the additions made by reissue.

This invention relates to transmission mechanisms and more particularly to an improved hydraulically controlled selective transmission especially, but not exclusively, designed for use in the propulsion of automotive vehicles.

In conventional transmission mechanisms, the gearing is usually arranged to run in a lubricant bath in a transmission housing and the transmission gears are either shifted axially with respect to their respective transmission shafts or constantly in mesh with control clutches which embody elements which rotate with the gears or the shafts in the oil bath, and, in either case, access to the clutches is difficult, requiring substantial dismantling, due to their location within the transmission housing. Also, due to the arrangement of known types of transmission clutches, with the latter rotating with certain of the gears or their shafts within the oil bath, some fluid drag is at all times present as well as a greater possibility of a contamination of the oil. In a transmission which is automatically controlled and which has its clutch actuators operated by fluid pressure, the connections to the internally located clutches are made relatively complicated. Moreover, in transmissions wherein the clutches or the gears are automatically shifted, further complications are involved. The present invention contemplates improvements over such known types of transmission mechanisms in that the transmission gears are constantly in mesh and drive at different speeds is selectively effected by clutches which are mounted on the transmission housing externally thereof and which have external actuating connections. Thus, by the provision of the novel structure of the present invention, excessive fluid drag is eliminated, the possibility of contamination of the lubricant is substantially reduced and the fluid connections for operating the several clutches are made relatively simple. Further, in accordance with the present invention, a transmission mechanism is provided which is capable of heavy duty use, which lends itself to use with different types of prime movers either of the constant or variable speed type, and which embodies clutches which may be automatically operated in an extremely simple manner. The transmission of the present invention is relatively simple and foolproof, and is relatively rugged and compact.

An object of the present invention is to provide an improved selective transmission mechanism. Another object is to provide an improved hydraulically controlled transmission. A further object is to provide an improved selective multispeed transmission mechanism wherein the transmission gears are constantly in mesh and which may be selectively made effective to provide multiple speed drive in either direction through clutches arranged exteriorly of the transmission housing. Yet another object is to provide an improved selective transmission of the character wherein the clutches are actuated by fluid under pressure. A still further object is to provide an improved automatic transmission mechanism wherein the transmission gears are automatically rendered effective to effect drive at the proper speed automatically in accordance with the particular conditions encountered. Still another object is to provide an improved electrical control system associated with the hydraulic control for the transmission mechanism. A still further object is to provide an improved heavy duty transmission mechanism which is relatively simple, compact and rugged in design, well adapted for use with certain types of automotive vehicles which are adapted to carry heavy loads. These and other uses and advantages of the invention will, however, hereinafter more fully appear.

In the accompanying drawings there is shown for purposes of illustration one form which the invention may assume in practice.

Figure 3:
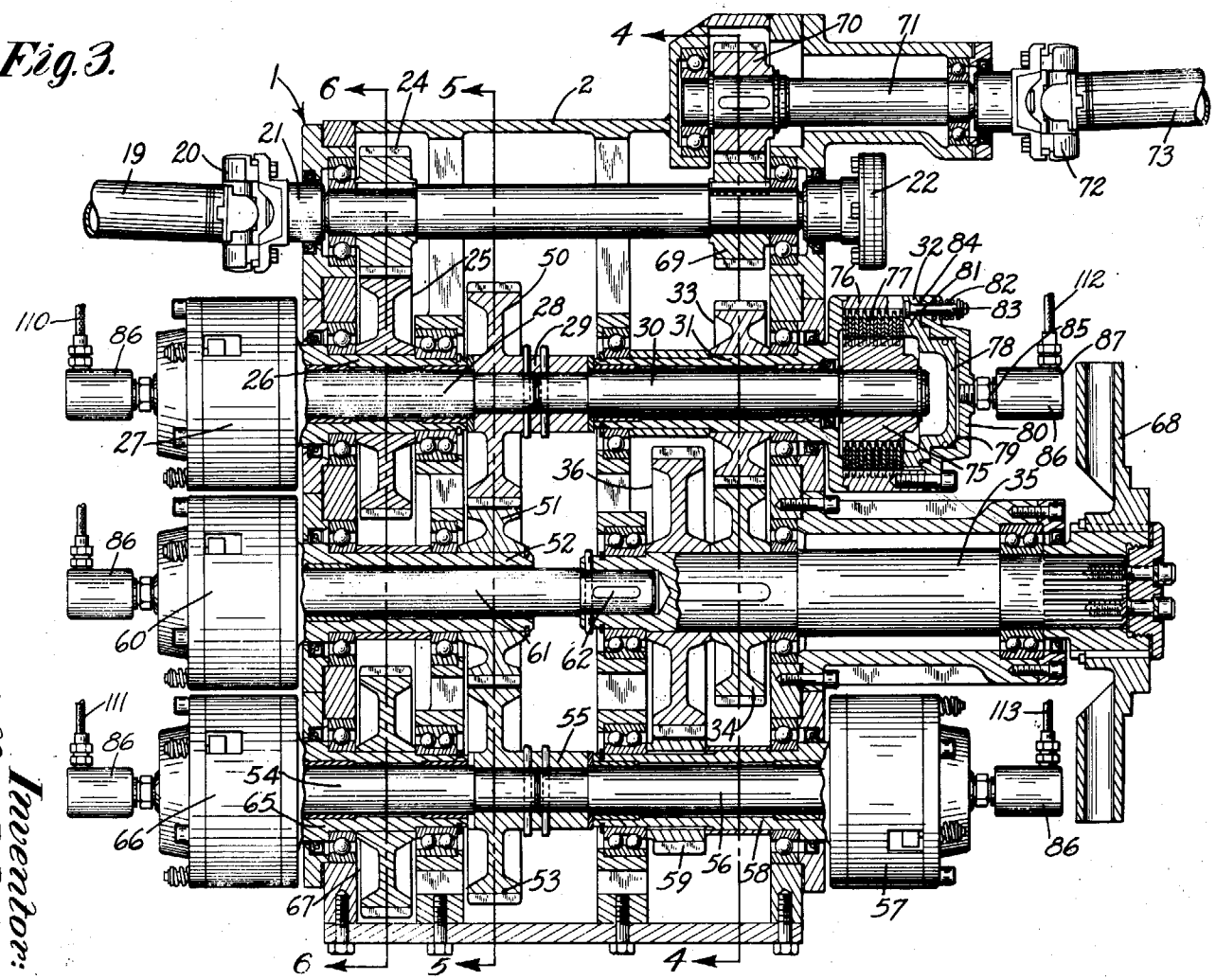
Figure 3 is a developed longitudinal section taken substantially on the planes of line 3—3 of Figure 2, showing the transmission gears and the associated control clutches.
Figure 4:
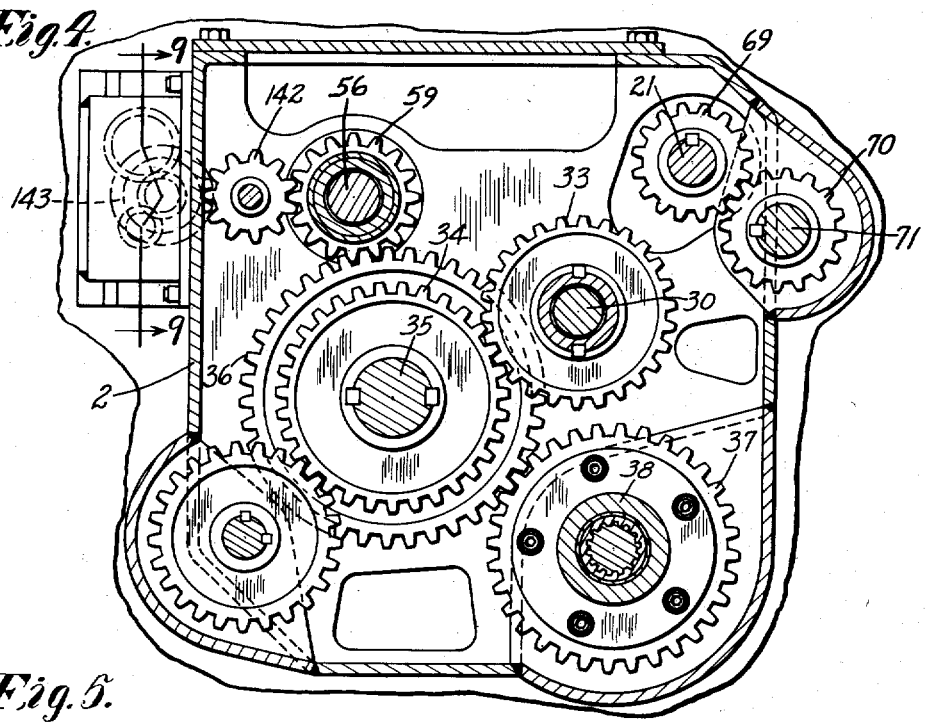
Figure 5:
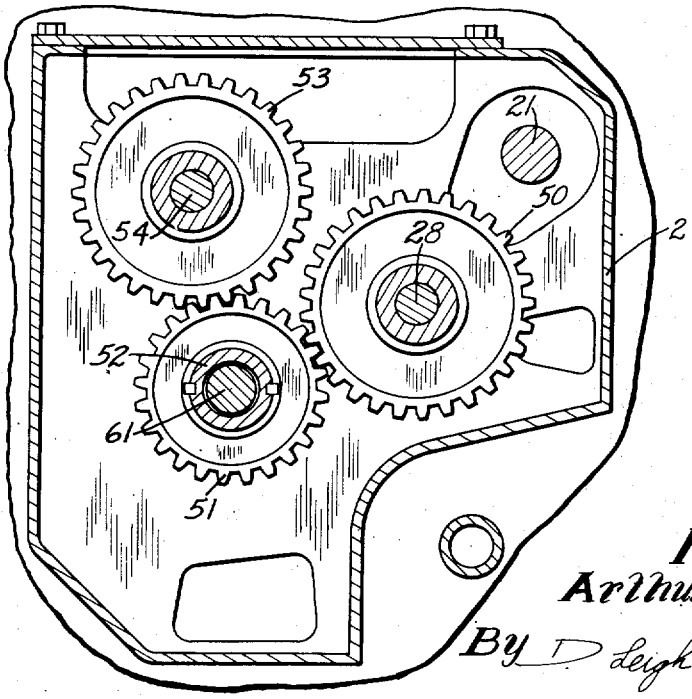
Figure 6:
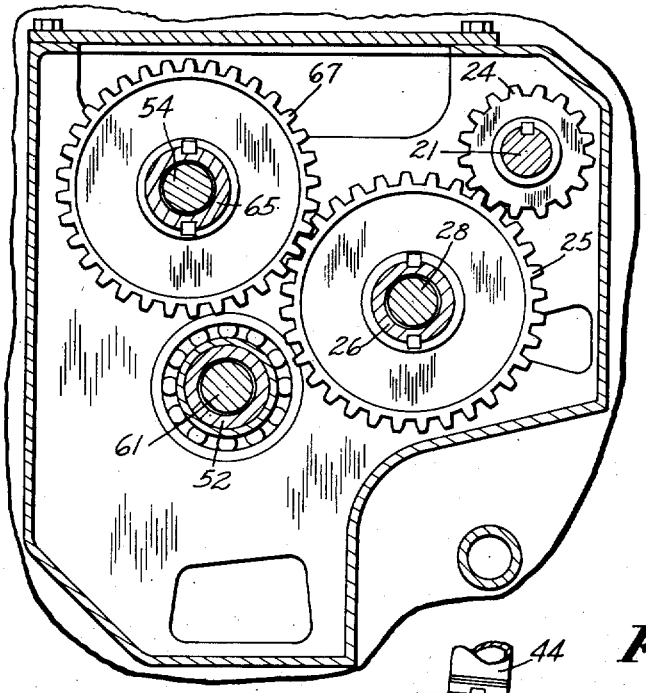

Figures 4, 5 and 6 are cross sectional views taken substantially on lines 4—4, 5—5 and 6—6 respectively, of Figure 3.

Figure 7:
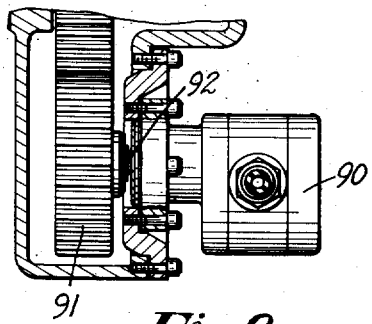
Figure 10:
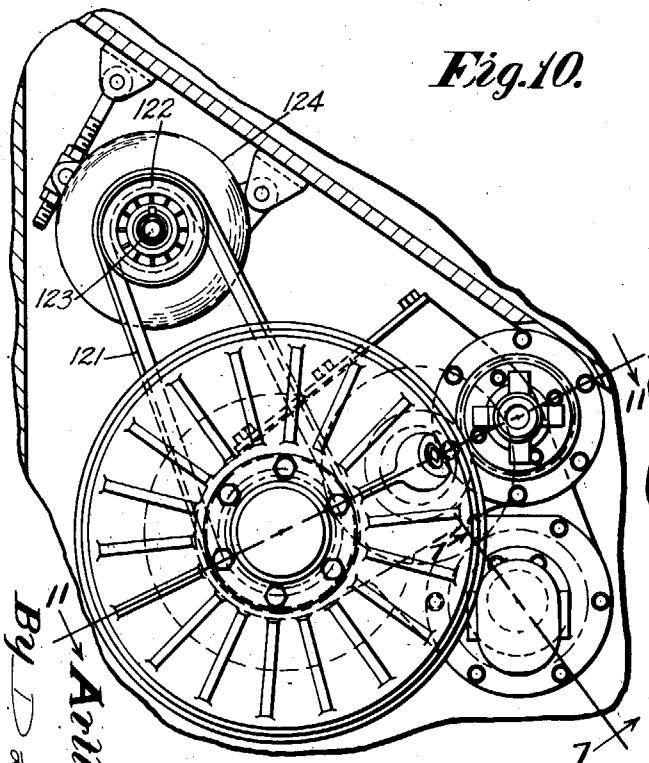

Figure 7 is a detail section taken substantially on line 7—7 of Figure 10 and illustrating the pump and a portion of its drive.

Figure 1:
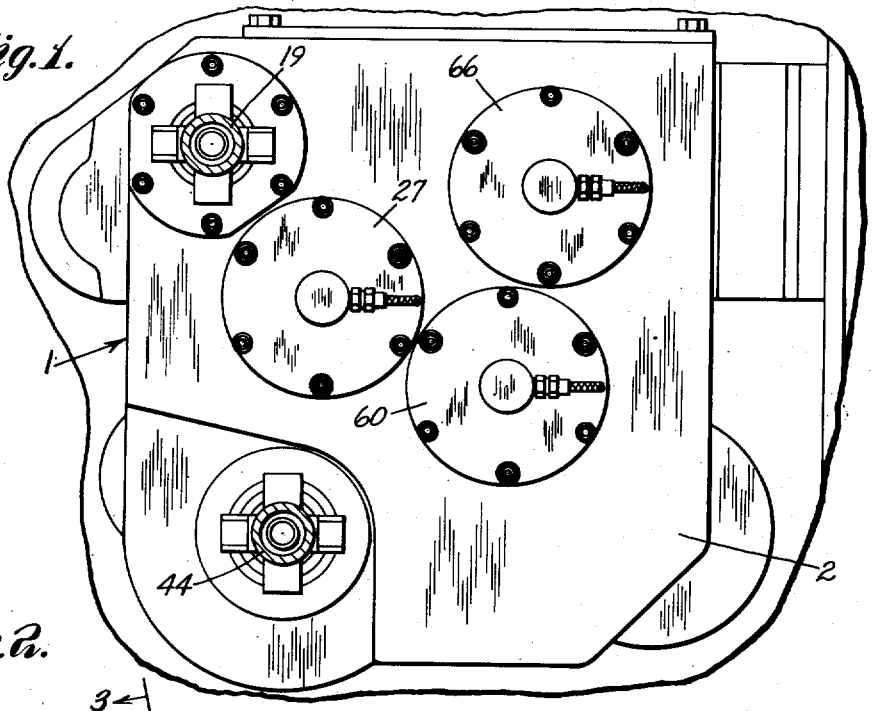
Figure 1 is an end elevational view of a preferred illustrative form of the improved transmission mechanism.
Figure 2:
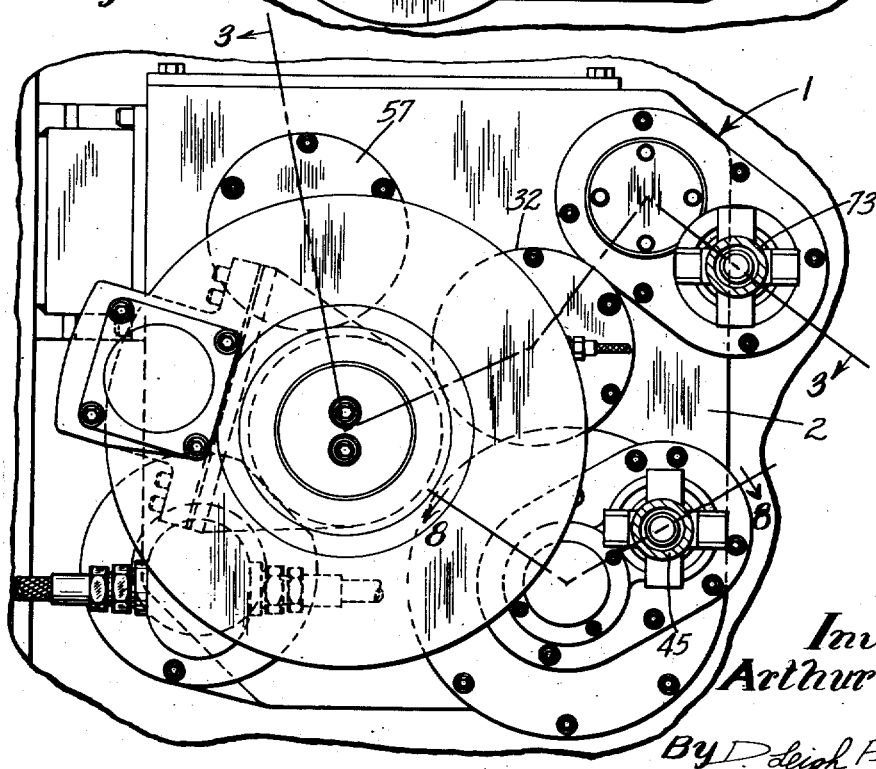
Figure 2 is an elevational view looking toward the opposite end of the transmission mechanism from that shown in Figure 1.
Figure 8:
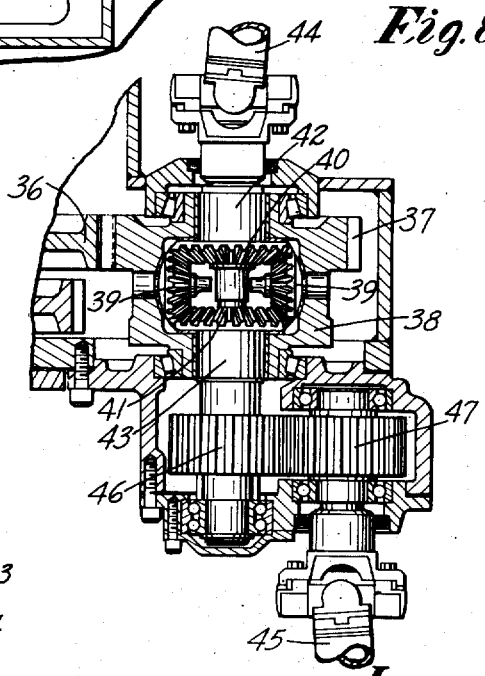

Figure 8 is a detail section taken substantially on the planes of line 8—8 of Figure 2, showing the terminal driving element of the transmission and the associated differential gearing.

Figure 9:
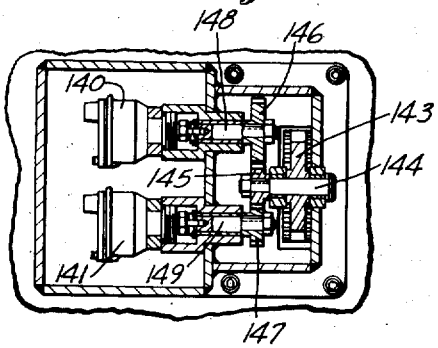

Figure 9 is a detail section taken substantially on the planes of line 9—9 of Figure 4, illustrating the centrifugal control switches and a portion of their drive.

Figure 10 is a detail elevational view showing the hydraulic coupling and its associated parts.

Figure 11:
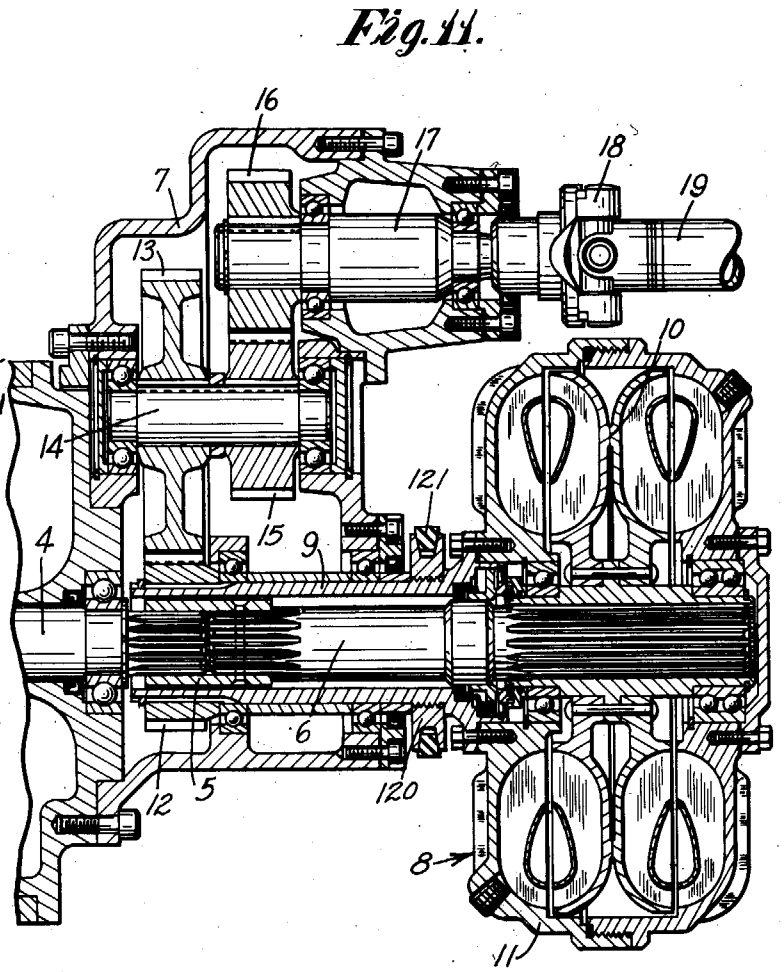

Figure 11 is a longitudinal sectional view taken substantially on line 11—11 of Figure 10.

Figure 12 is a diagrammatic view showing the hydraulic and electrical system.

The improved transmission mechanism is generally designated 1 and, as shown in the drawings, includes a housing or casing 2 adapted to contain a lubricant bath and enclosing transmission gearing embodying constantly meshing gears which run in the lubricant bath. A prime mover 3, herein desirably an electric motor which may be either of the A. C. or D. C. type, has its power shaft 4 (Figure 11) suitably coupled at 5 to an axially aligned shaft 6 herein suitably journaled within a casing 7 which may be suitably mounted on the vehicle chassis or other suitable support, and the motor is carried by this casing. The shaft 6 is connected by a conventional hydraulic coupling or torque converter 8 to a coaxial tubular shaft 9 likewise suitably journaled with the casing 7. The hydraulic coupling 8 has a usual rotor or impeller 10 having its hub secured to the shaft 6 and contained in a rotatable casing 11 secured to the coaxial shaft 9. The rotatable casing 11 contains a liquid such as a light oil so that the casing may be driven by the rotor through the liquid as the rotor comes up to speed, in a well known manner. Keyed to the shaft 9 is a gear 12 meshing with a gear 13 keyed to a parallel shaft 14 also suitably journaled within the casing 7. Keyed to the shaft 14 is a spur gear 15 meshing with a spur gear 16 keyed to a parallel shaft 17 likewise suitably journaled within the casing, and the shaft 17 is connected through a universal joint 18 to a transmission shaft 19, the latter in turn being connected by a universal joint 20 (see Figure 3) to an input shaft 21. The shaft 21 is horizontally disposed and extends longitudinally of and is suitably journaled within the transmission housing 2, as shown in Figure 3. The opposite end of the input shaft has secured thereto a suitable coupling element 22 for an alternative source of input power.

The input shaft 21 has a spur gear 24 keyed thereto within the transmission housing and this gear meshes with and drives a spur gear 25 (see also Figure 6) keyed to a tubular shaft 26 arranged parallel with the shaft 21 and likewise suitably journaled within the transmission housing. The shaft 26 is connectible by a forward drive clutch 27 to a coaxial shaft 28 extending axially through the shaft 26 and coupled at 29 to an axially aligned longitudinal shaft 30. The [latter] *longitudinal* shaft *30* is arranged coaxially within a tubular shaft 31 suitably journaled within the transmission housing, and the aligned shafts 28 and 30 are suitably journaled within bearing bushings supported within the tubular shaft 26 and 31, in the manner shown. A second or intermediate speed clutch 32 serves to connect the shaft 30 to the tubular shaft 31, and keyed to this latter shaft is a spur gear 33 (Figure 4) meshing with a spur gear 34 in turn keyed to a parallel longitudinally extending shaft 35 likewise suitably journaled within the transmission housing. Also, keyed to the shaft 35 is a larger spur gear 36 which meshes with and drives a spur gear 37 (Figure 8) secured to a differential housing 38. This differential housing is suitable journaled within the transmission housing and carries usual bevel planet gears 39 meshing with coaxial bevel gears 40 and 41 secured to axially aligned longitudinally extending shafts 42 and 43 respectively, also suitably journaled within the transmission housing. The shafts 42 and 43 are respectively connected to oppositely extending, longitudinal output shafts 44 and 45 which are in turn connected to suitable drive elements such as the traction wheels of an automotive vehicle. Intermeshing spur reversing gears 46 and 47 are connected between the shafts 43 and 45 so that the driven elements may be concurrently driven in the same direction. The gear 37 constitutes the terminal driving gear of the transmission through which all speeds in either direction are transmitted.

In this improved construction, a spur gear 50 (Figures 3 and 5) is secured to an element of the coupling 29 and meshes with and drives a spur gear 51 keyed to a tubular shaft 52 which is coaxial with the shaft 35 and likewise suitably journaled within the transmission housing. The gear 51 meshes with and drives a spur gear 53 keyed to a parallel shaft 54 suitably journaled within the transmission housing. The hub of the gear 53 serves as a coupling 55 for connecting an aligned shaft 56 to the gear. The shaft 56 is connectible by a first or low speed clutch 57 to a coaxial tubular shaft 58 suitably journaled within the transmission housing and through which the shaft 56 axially extends. Keyed to the shaft 58 is a spur gear 59 which meshes with the larger spur gear 36 which drives the terminal gear 37. The shaft 52 is connectible by a third or high speed clutch 60 to a coaxial shaft 61 which is axially aligned with and keyed at 62 to the shaft 35. The shaft 61 is suitably journaled in a bearing bushing supported within the shaft 52.

The spur gear 53 has its hub providing the coupling between the shaft 56 and the axially aligned shaft 54 (Figure 3), the latter suitably journaled in bearing bushings supported within a tubular shaft 65 which is in turn suitably journaled within the transmission housing. A reverse clutch 66 serves to connect the shaft 65 to the shaft 54. Keyed to the tubular shaft 65 is a spur gear 67 meshing with the spur gear 25 (see Figure 6). Secured to the shaft 35 is a brake element 68 of a conventional spot type brake. Keyed to the shaft 21 (Figure 3) within the transmission housing is a spur gear 69 meshing with and driving a spur gear 70 keyed to a parallel longitudinal shaft 71 also suitably journaled within the transmission housing. The shaft 71 is connected through a universal joint 72 to an output shaft 73 which may serve to drive certain auxiliary mechanism. The spur gears of the transmission gearing are in constant mesh and are held against axial movement with respect to their respective shafts.

The five control clutches 27, 32, 57, 60 and 66 are of the hydraulically operated multiple disc type and are arranged exteriorly of the transmission housing for ready accessibility and simplification. Each clutch includes an inner member 75 keyed to an inner shaft and an outer rotatable casing 76 secured to an outer tubular shaft and the member 75 and the casing carries interleaved clutch discs or plates 77 which when pressed together serve frictionally to connect the inner and outer shafts for rotation together. A piston 78 is received in a cylinder bore 79 formed within an end closure 80 of the rotatable clutch casing, and this piston is secured to a clutch operating element 81. The clutch operating element is normally held retracted by coil springs 82 which act on bolts 83 which pass through openings 84 in the casing and engage the clutch operating element, as shown in Figure 3. Each closure 80 has an element 85 of a conventional fluid swivel 86 connected thereto, and an outer element 87 of the swivel is coupled to a fluid conduit as later explained. Thus, liquid under pressure may flow from the conduit through the swivel to the cylinder bore 79 to act on the piston 78 of the clutch operating element 81 to move the latter inwardly against the action of the springs 82 to effect loading of the clutch discs. When the cylinder bore is suitably vented the spring retracts the operating element 81 to release the clutch.

*Thus, as described above, clutches 27 and 66 function as direction controlling or directional clutches with directional clutch 27 controlling forward directional movement of the change speed gearing and directional clutch 66 controlling reverse directional movement of the change speed gearing. The spur gears 25 and 67 are directional drive gears with forward directional drive gear imparting forward directional movement to the change speed gearing through tubular shaft 26, directional clutch 27 and shafting 28 and 30. Similarly reverse directional drive gear 67 is operable to impart reverse movement to the change speed gearing through tubular shaft 65, directional clutch 66 and shafting 54 and 56.*

*The clutches 32, 57 and 60 are speed controlling clutches and engage their respective change speed spur gears 33, 59 and 51 to the respective shafts 30, 56 and 61 which extend axially therethrough. Clutch 32 is the intermediate speed controlling clutch, clutch 57 is the low speed controlling clutch and clutch 60 is the high speed controlling clutch. The change speed gears 33, 59 and 51 may be defined as the intermediate change speed gear, the low change speed gear and the high change speed gear respectively since they are operatively associated with the respective speed controlling clutches. The remaining spur gears 34, 36, 50 and 53 are in constant mesh with the enumerated change speed gears and may also be defined as change speed gears.*

When the forward [drive] *directional* and second speed *controlling* clutches 27 and 32 are applied and the prime mover 3 is running, the terminal driving gear 37 of the transmission mechanism may be driven through the input shaft 21, spur [gears] *gear* 24 and *forward directional gear* 25, *tubular* shaft 26, *forward directional* clutch 27, shafts 28 and 30, *intermediate speed controlling* clutch 32, *tubular* shaft 31, *change speed* spur gears 33, 34, shaft 35 and *change speed* gear 36 meshing with the terminal gear 37. When the *intermediate speed controlling* clutch 32 is released and the first or low speed *controlling* clutch 57 is applied, the terminal gear 37 may be driven through gears 24, 25, *tubular* shaft 26, *forward directional* clutch 27, shaft 28, *change speed* gears 50, 51 and 53, shaft 56, *speed controlling* clutch 57, *tubular* shaft 58 and *change speed* gears 59 and 36. When the *low speed controlling* clutch 57 is released and the third or high speed *controlling* clutch 60 is applied the terminal gear 37 may be driven through the spur gears 24, 25, *tubular* shaft 26, *forward directional* clutch 27, shaft 28, *change speed* gears 50, 51, *tubular* shaft 52, *speed controlling* clutch 60, shaft 61 and gear 36.

Upon release of the forward *directional* drive clutch 27 and upon application of the reverse *directional drive* clutch 66 the drive through any [one] of the three speeds may be effected in the reverse direction through spur [gears] *gear* 24, *forward directional gear* 25 and *reverse directional gear* 67. *For example, when reverse directional clutch 66 and intermediate speed controlling clutch 32 are applied, the terminal driving gear may be driven through the input shaft 21, spur gear 24, forward directional gear 25, reverse directional gear 67, tubular shaft 65, reverse directional clutch 66, shaft 54, change speed gears 53, 51 and 50, shaft 30, intermediate speed controlling clutch 32, tubular shaft 31, change speed gears 33 and 34, shaft 35 and gear 36 meshing with terminal gear 37. To obtain a low speed in the reverse direction, intermediate clutch 32 is released and reverse directional clutch 66 and low speed controlling clutch 57 are engaged. The terminal driving gear may then be driven in the reverse direction through input shaft 21, spur gear 24, forward directional gear 25, reverse directional gear 67, tubular shaft 65, reverse directional clutch 66, shafting 54 and 56, low speed controlling clutch 57, tubular shaft 58 and change speed gears 59 and 36 to terminal gear 37. Similarly to obtain a high speed in the reverse direction, low speed clutch 57 is released and reverse directional clutch 66 and high speed controlling clutch 60 are engaged. In this selection input shaft 21 drives through spur gear 24, forward directional gear 25, reverse directional gear 67, tubular shaft 65, reverse directional clutch 66, shaft 54, change speed gears 53 and 51, tubular shaft 52, high speed controlling clutch 60, shafting 61, 35 and spur gear 36 to terminal gear 37.*

*In my transmission there are three groups of parallel shaftings, the first shafting including shafts 28 and 30 coupled at 29, the second shafting including shafts 61 and 35 coupled at 62 and the third shafting including shafts 54 and 56 coupled at 55. The three groups of parallel shaftings are all active in both directions of movement, that is, all shaftings are active to provide movement in both the forward and reverse direction.*

*For example, input shaft 21 which is connected to a unidirectional prime mover rotates in a fixed clockwise direction. When the forward directional clutch 27 is engaged, the first shafting rotates in a counterclockwise direction since gears 24 and 25 are in mesh and the third shafting rotates in a counterclockwise direction because it is driven by gears 50, 51 and 53. The second shafting then rotates in a clockwise direction since it is driven by intermeshing gearing secured to either the first or third shafting. When the reverse directional clutch 66 is engaged the third shafting will rotate in a clockwise direction because it is driven by spur gear 24, forward directional gear 25 and reverse directional gear 67. The first shafting will rotate in clockwise dircetion also since it is driven by gears 53, 51 and 50. The second shafting will then rotate in a counterclockwise direction because it is driven by intermeshing gearing secured to the first or third shafting. Thus with my arrangement all unidirectional shafting is eliminated and all shafting provided is utilized to provide a plurality of speeds in both directions.*

Now referring to the control mechanism for the several friction clutches it will be noted that driven by the motor 3 is a conventional hydraulic pump 90 (Figure 7), and a spur gear 91 meshes with and is driven by the spur gear 13 (Figure 11) and is connected to the pump drive shaft 92. The pump has its suction side connected by a conduit 93 (Figure 12) to a liquid reservoir or tank 94 and the discharge side of the pump is connected to a pressure conduit 95 containing a conventional pressure reducing valve 96 and leading through branch conduits 97, 98 and 99 to the casings of conventional slide type valve devices 100, 101 and 102. The casing of the valve device 102 is connected by a conduit 103 to a similar slide valve device 104. The bores of the casings of the valve devices 100, 101, 102 and 104 are connected by branches 105, 106, 107 and 108 to a discharge conduit 109 leading back to the tank 94. The bore of the casing of the valve device 100 is connected by a conduit 110 to the swivel 86 of the forward drive clutch 27, while the bore of the casing of the valve device 101 is connected by a conduit 111 to the swivel 86 of the reverse drive clutch 66. The bore of the casing of the valve device 104 is connected by conduits 112 and 113 to the swivels 86 of the second and low speed clutches 32 and 57 respectively while the bore of the casing of the valve device 102 is connected by conduit 114 to the swivel of the high speed clutch 60. Each of the valve casings of the valve devices 100, 101, 102, and 104 are electrically actuated by solenoids 115, 116, 117 and 118 respectively, and a conventional manually operable master or selector switch generally designated 119 may be manually positioned to effect energization of certain of the solenoids, as later explained, to effect actuation of their respective slide valves. Arranged in adjacency to the hydraulic coupling 8 and secured to the shaft 9 is a pulley 120 which is connected by an endless drive belt 121 to a pulley 122 secured to the drive shaft 123 (see Figure 10) of a conventional electric generator 124 and this generator is adapted to generate electricity to effect charging of a conventional storage battery 125. Evidently, instead of a battery, any other suitable source of electric energy may be provided. Line 126 leads from the positive side of the battery to branch lines connected to the coils of the solenoids 115, 116, 117 and 118 respectively and a line 127 leads to the negative side of the battery.

A conventional operator controlled switch mechanism 128 has an operating element 129 which is connected to actuate forward and reverse switches 130 and 131 which serve respectively to energize the solenoids 115 and 116 which control the forward and reverse valves of the valve devices 100 and 101 which effect alternate loading of the forward and reverse drive clutches 27 and 66. The reversing switches 130 and 131 are connected by lines 132 and 133 with the positive line 126 and lines 134 and 135 lead from the master or selector switch 119 to the solenoids 136 and 137 respectively of solenoid actuated switches 138 and 139. Thus, when the forward drive switch 130 is closed the solenoid 115 is energized to actuate the valve controlling the clutch 27 and the selector switch 119 may then be positioned to energize the desired one of the solenoids 136 thereby to effect energization of the proper ones of the solenoids 117 and 118 selectively to operate the low, intermediate and high speed clutches 57, 32 and 60. When reverse drive at any one of the three speeds is desired the reverse control switch 131 may be closed thereby to energize the solenoid 116 which controls the valve device 101 thereby to apply the reverse drive clutch 66, while the forward drive clutch 27 is released due to the opening of the switch 130.

The means for effecting automatic selection of different speeds depending upon the speed of the transmission resulting from varying load comprises centrifugal switches 140 and 141 (Figure 9) driven by a spur gear 142 (Figure 4) meshing with and driven by the spur gear 59, and the gear 142 drives a gear 143 (Figure 9) keyed to a shaft 144. Secured to the shaft 144 is a gear 145 meshing at its opposite sides with gears 146 and 147 having different tooth ratios and respectively secured to the shafts 148 and 149 of the centrifugal switches. Thus, the switches 140 and 141, due to their different speed drives, are adapted to operate at relatively different speeds. When the transmission mechanism is operating at a very low speed, as for example when the vehicle is moving up a grade, *the speed of the transmission is inadquate to actuate switch 140 and thus both solenoids 136 and 137 are deenergized. The slide valve 104 being a two position valve, conduit 113 will be pressurized and thus actuate low speed clutch 57. As the vehicle speed increases* the switch 140 is automatically actuated to effect energization of the solenoid actuator 137 for the switch 139 thereby to close the circuit to the solenoid 118 which actuates the slide valve which controls the low and intermediate speed clutches 57 and 32. *If the selector switch 119 is set for intermediate speed, the closing of switch 140 will energize holding solenoid 137 which in turn will complete the circuit to valve controlling solenoid 118. With controlling solenoid 118 energized conduit 112 is pressurized and the pressure relieved from conduit 113 thus disengaging low speed controlling clutch 57 and energizing intermediate speed controlling clutch 32.* At a higher speed the switch 141 is actuated to effect energization of the solenoid actuator 136 for the switch 138 thereby to close the circuit to the solenoid 117 which actuates the slide valve which controls the high speed clutch 60. Thus, by the provision of the centrifugal switches the clutches 32, 57 and 60 may be automatically selectively operated in accordance with the operating speed of the transmission due to the vehicle moving along different gradients.

If the selector switch 119 is positioned to effect application of the low speed *controlling* clutch 57, *as shown in Figure 12*, the drive always remains in low regardless of the centrifugal switches, and when the selector switch 119 is positioned to effect application of the intermediate speed *controlling* clutch 32, *i. e., completing the circuit between the top leads in Figure 12 with the elongated top conductor,* the centrifugal switch 140 may effect automatic changing from second to low in the event the speed of the transmission falls too low. When the selector switch 119 is positioned to effect application of the high speed *controlling* clutch *60 by completing the circuit between the lower leads with the lower conductor in Figure 12* the centrifugal switches 140 and 141 may automatically effect changing from high to second and then to low again depending upon the speed of the transmission. Conversely, the speed may be automatically changed from low to second and from second to high as the speed of the transmission increases and depending on the position of the selector switch 119.

As a result of this invention an improved selective transmission mechanism is provided whereby improved efficiency, especially under heavy duty operation, is attained. By maintaining the transmission gears constantly in mesh and by locating the control clutches exteriorly of the transmission housing, fluid drag which is present when the clutches are located within the housing is substantially eliminated and the possibility of contamination of the lubricating oil due to dirt is substantially reduced. The novel location of the control clutches provides for ready accessibility for adjustment and repair and the control connections are greatly simplified. *The novel arrangement of the change speed gearing and directional gearing provides a plurality of speeds in both the forward and reverse direction utilizing the same change speed gearing. The novel shafting arrangement provides for a maximum number of speeds in both directions with a minimum number of shaftings.* By the provision of the hydraulic and electrical control system the control clutches may be hydraulically operated under the control of a manually operable master switch, and by associating centrifugal switches, driven by the transmission mechanism, with the manual control, the clutches may be automatically operated in accordance with the operating speed of and the load on the transmission mechanism. The mechanism is relatively simple and durable and is relatively compact, well adapted for its intended purpose. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a selective transmission mechanism, the combination comprising a transmission housing, an input shaft journaled in said housing, a tubular shaft, constantly meshing gearing connecting said input shaft to said tubular shaft, a second tubular shaft axially aligned with said first mentioned tubular shaft, said tubular shafts journaled in said housing, shafting extending axially through said tubular shafts, a clutch arranged exteriorly of said housing for connecting said shafting to said first mentioned tubular shaft, a clutch arranged exteriorly of said housing for connecting said shafting to said second mentioned tubular shaft, an output shaft journaled in said housing, and driving connections between said second mentioned tubular shaft and said output shaft, said clutches arranged exteriorly of said housing as aforementioned, and said tubular shafts having portions projecting from said housing and carrying elements of said clutches.

2. A selective transmission mechanism as set forth in claim 1 wherein said driving connections also include a pair of coaxial relatively rotatable shafts arranged parallel with said tubular shafts and said shafting, a gear secured to said shafting, a gear on one of said coaxial shafts and meshing with and driven by said gear, and a clutch also arranged exteriorly of said housing for connecting said coaxial shafts for rotation together.

3. A selective transmission mechanism as set forth in claim 2 wherein said driving connections further include a second pair of coaxially relatively rotatable shafts journaled within said housing in parallelism with said shafts, a gear on one of said latter shafts and meshing with and driven by said last mentioned gear, and a clutch arranged exteriorly of said housing for connecting said second pair of shafts for rotation together.

4. In a selective transmission mechanism, the combination comprising a transmission housing, an input shaft journaled in said housing, a tubular shaft, constantly meshing gearing connecting said input shaft to said tubular shaft, a second tubular shaft aligned with said first mentioned tubular shaft, said tubular shafts journaled in said housing, shafting extending axially through said tubular shafts, a clutch arranged exteriorly of said housing for connecting said shafting to said first mentioned tubular shaft, a clutch arranged exteriorly of said housing for connecting said shafting to said second mentioned tubular shaft, an output shaft journaled in said housing, and driving connections between said second mentioned tubular shaft and said output shaft, said clutches arranged exteriorly of said housing, and said tubular shafts having portions projecting from said housing and carrying elements of said clutches, said driving connections also including a pair of coaxial relatively rotatable shafts arranged parallel with said tubular shafts and said shafting, a gear secured to said shafting, a gear on one of said coaxial shafts and meshing with and driven by said gear, a clutch also arranged exteriorly of said housing for connecting said coaxial shafts for rotation together, a second pair of coaxially relatively rotatable shafts journaled within said housing in parallelism with said shafts, a gear on one of said latter shafts and meshing with and driven by said last mentioned gear, and a clutch arranged exteriorly of said housing for connecting said second pair of shafts for rotation together.

5. In a [selective] *constant mesh* transmission mechanism *having a plurality of speeds in both forward and*

*reverse direction,* the combination comprising transmission housing, constantly meshing change speed gears arranged in said housing, *directional gears arranged in said housing,* parallel shafts secured to certain ones of said *directional and said change speed* gears and projecting from said housing, each of said projecting shafts having a shaft coaxial therewith and rotatable relative thereto, *directional clutches mounted on certain of said projecting shafts exteriorly of said housing for connecting said projecting shafts and said respective coaxial shafts for rotation together,* [and] speed controlling clutches mounted on *certain of* said projecting shafts exteriorly of said housing for connecting said *last named* projecting shafts and said coaxial shafts for rotation together, said clutches having elements coaxial with and secured to said projecting shafts, *and driving connections between said directional gears and said change speed gears, said directional clutches arranged for alternately effecting forward and reverse drive through said change speed gears and said speed controlling clutches arranged to effect drive at different selected speeds in either of the selected directions.*

6. In a reversible transmission mechanism, the combination comprising a transmission housing, selective change speed and reversing gearing having constantly meshing change speed gears and arranged in said housing, parallel shaftings journaled within said housing and respectively arranged coaxial with certain of said gears, forward and reverse clutches arranged coaxial with said parallel shaftings respectively for alternately effecting forward and reverse drive through said gearing, and clutches arranged coaxial with said parallel shaftings respectively for selectively effecting drive through the associated change speed gears at different predetermined speeds.

7. A reversible transmission mechanism of the character set forth in claim 6 wherein [a third] *another* shafting is journaled in said housing and arranged coaxially with others of said change speed gears, and a clutch coaxial with said [third] *last named* shafting for effecting drive through the associated change speed gears at still a different predetermined speed.

8. In a reversible transmission mechanism of the character set forth in claim 6 wherein control means is provided for effecting operation [of either] of said speed control clutches only after operation of one or the other of said forward and reverse clutches.

9. In a reversible transmission mechanism of the character set forth in claim 6 wherein separate control [devices] *means* are provided for said forward and reverse clutches and said speed control clutches, and connections whereby said control means for one or the other of said forward and reverse clutches must be operated prior to the [application] *operation* of said *control means for said* speed control clutches.

10. In a transmission mechanism, the combination comprising change speed gearing having its gears always in mesh, clutches operatively associated with certain of said gears for effecting drive at different speeds through said change speed gearing, fluid operating devices for said clutches, valves for controlling fluid flow to said clutch operating devices, an electrical circuit comprising solenoids for actuating said valves, a master switch, and solenoid actuated switches controlled by said master switch for effecting energization of said solenoids to effect valve actuation, centrifugal switches, and means driven by an element of said change speed gearing for rotating elements of said latter switches for automatically effecting energization of the solenoids of said solenoid actuated switches whereby the speed of the transmission mechanism may effect automatic loading of different clutches to provide different speeds.

11. In combination, a prime mover, a pump driven thereby, a selective transmission mechanism having an input shaft driven by said prime mover, constantly meshing change speed gearing, clutches operatively associated with said gearing for selectively controlling drive at different predetermined speeds through said gearing, fluid operated actuators for said clutches, valves for controlling fluid flow to said actuators, an electrical circuit comprising solenoids for actuating said valves, and a selector switch for controlling the energization of said solenoids, centrifugally controlled switches, and means driven by an element of said transmission mechanism for rotating elements of said latter switches for automatically controlling the energization of said solenoids for actuating said valves independently of adjusting movement of said selector switch.

12. In combination, a prime mover, a pump driven thereby, a selective transmission having an input shaft driven by said prime mover, constantly meshing change speed gearing, clutches operatively associated with said gearing for selectively controlling drive at different speeds through said gearing, fluid operated actuators for said clutches, valves for controlling fluid flow to said actuators, an electrical circuit comprising solenoids for actuating said valves, solenoid actuated switches for controlling the energization of said valve actuating solenoids, and a selector switch for alternately effecting energization of said solenoids to effect closure of the elected one of said switches, centrifugally controlled switches, and means driven by an element of said transmission mechanism for rotating elements of said last mentioned switches for automatically effecting energization of the solenoids of said solenoid actuated switches for effecting closure thereof independently of adjusting movement of said selector switch.

13. In a selective transmission mechanism, the combination comprising a transmission housing, an input shaft journaled in said housing, a tubular shaft, constantly meshing gearing *consisting of a pair of gears secured to said input shaft and said tubular shaft for* connecting said input shaft to said tubular shaft, a second tubular shaft arranged parallel with said first tubular shaft, intermeshing gearing for connecting said parallel tubular shafts for rotation in relatively opposite directions, said tubular shafts having end portions projecting outwardly from said housing, shafts coaxial with and extending axially through said tubular shafts respectively, and clutches arranged exteriorly of said housing for connecting said coaxial shafts with said tubular shafts respectively, said clutches having elements carried by said projecting end portions of said tubular shafts.

14. A selective transmission mechanism as set forth in claim 13 wherein change speed gearings are driven by said coaxial shafts and said clutches are reversing clutches selectively connectable to effect drive through one coaxial shaft in one direction and through said other coaxial shaft in the opposite direction.

15. A selective transmission mechanism as set forth in claim 14 wherein a driven shaft is arranged parallel with said coaxial shafts, change speed gearings are arranged between said coaxial shafts and said driven shaft, and clutches are arranged coaxial with said coaxial shafts respectively for selectively effecting drive of said driven shaft at relatively different speeds.

16. In a selective transmission mechanism, the combination comprising a transmission housing, an input shaft journaled in said housing, a pair of coaxial relatively rotatable shafts, constantly meshing gearing connecting said input shaft to one of said coaxial shafts, a second and separate pair of coaxial relatively rotatable shafts arranged in parallel relationship to said first pair, constantly meshing gearing connecting one of said first pair of coaxial shafts to one of said second pair of coaxial shafts *for rotation in relatively opposite directions, directional* clutches arranged exteriorly of said housing [for connecting the] *to selectively connect said* coaxial shafts of each of said pairs for rotation together, *change speed gearing secured on the other of said first pair of*

*coaxial shafts and the other of said second pair of coaxial shafts,* an output shaft journaled in said housing, and driving connections between said [second mentioned pair of coaxial shafts] *change speed gearing* and said output shaft *for effecting drive of said output shaft at relatively different speeds in both forward and reverse direction.*

17. In a transmission mechanism, the combination comprising change speed and reversing gearing having its gears always in mesh, speed controlling clutches operatively associated with certain of said gears for effecting drive at different predetermined speeds through said change speed gearing, reversing clutches also operatively associated with certain of said gears for effecting reversal of drive at any of the selected different speeds, fluid operating devices for said speed controlling and reversing clutches, valves for controlling fluid flow to said clutch operating devices, and an electrical circuit comprising solenoids for actuating said valves, a master switch and solenoid actuated switches controlled by said master switch for effecting energization of said solenoids to effect valve actuation.

18. In combination, a prime mover, a pump driven thereby, a selective transmission mechanism having an input shaft driven by said prime mover, constantly meshing change speed and reversing gearing, clutches operatively associated with said gearing for selectively controlling drive at different predetermined speeds through the gears of said gearing and for effecting reverse drive at any of the selected different speeds, fluid operated actuators for said clutches, valves for controlling fluid flow to said actuators, and an electrical circuit comprising solenoids for actuating said valves and a selector switch for controlling the energization of said solenoids.

19. In combination, a prime mover, a pump driven thereby, a selective transmission having an input shaft driven by said prime mover, constantly meshing change speed and reversing gearing, clutches operatively associated with said gearing for selectively controlling drive at different speeds through the gears of said gearing and for effecting reverse drive at any of the selected different speeds, fluid operated actuators for said clutches, valves for controlling fluid flow to said actuators, and an electrical circuit comprising solenoids for actuating said valves, solenoid actuated switches for controlling the energization of said valve actuating solenoids, and a selector switch for alternately effecting energization of said solenoids to effect closure of the elected one of said switches.

*20. In a constant mesh transmission having a plurality of speeds in both forward and reverse direction the combination comprising a plurality of shafts, means rotatably supporting said shafts in spaced parallel relation to each other, directional gears coaxially arranged on certain of said shafts, directional clutches for connecting said directional gears to said shafts which extend axially therethrough, constantly meshing change speed gears arranged coaxially on certain of said shafts, a plurality of speed controlling clutches for connecting certain of said change speed gears to said shafts which extend axially therethrough, driving connections between said directional gears and said change speed gears, said directional clutches arranged for alternately effecting forward and reverse drive through said change speed gears and said speed controlling clutches arranged to effect drive at different selected speeds in either of the selected directions through said change speed gears.*

*21. In a constant mesh transmission having a plurality of speeds in both forward and reverse direction the combination comprising a transmission housing, a plurality of shafts rotatably mounted in said housing in spaced parallel relation to each other, certain of said shaft end portions projecting from said housing, said shafts including an input shaft and output shaft, a forward directional gear coaxially and rotatably positioned on one of said shafts and having a portion projecting from said housing, a forward directional clutch arranged exteriorly of said housing for connecting said forward directional gear to said shaft which extends coaxially therethrough, a reverse directional gear coaxially and rotatably positioned on another of said shafts and having a portion projecting from said housing, a reverse directional clutch arranged exteriorly of said housing for connecting said reverse directional gear to said shaft which extends coaxially therethrough, a plurality of constantly meshing change speed gears arranged within said housing, certain of said change speed gears being non-rotatably secured to certain of said shafts and other of said change speed gears being coaxially and rotatably positioned on certain of said shafts, said last named change speed gears having portions projecting from said housing, speed controlling clutches arranged exteriorly of said housing for connecting said last named change speed gears to said respective shafts which extend coaxially therethrough, driving connections between said forward directional gear, said reverse directional gear and said change speed gears, said forward and reverse directional clutches arranged for alternately effecting forward and reverse drive of said output shaft through said change speed gears, and said speed controlling clutches arranged to effect drive of said output shaft at different selected speeds in either of the selected directions through said change speed gears.*

*22. In a constant mesh transmission mechanism having a plurality of speeds in both forward and reverse direction the combination comprising a transmission housing, a first tubular shaft journaled in said housing, a forward directional gear coaxially secured to said first tubular shaft within said housing, a second tubular shaft journaled in said housing in parallel relation to said first tubular shaft, a reverse directional gear coaxially secured to said tubular shaft within said housing, a third tubular shaft journaled in said housing in parallel relation to said other tubular shafts, a first change speed gear coaxially secured to said third tubular shaft within said housing, a fourth tubular shaft journaled in said housing in parallel relation to said other tubular shafts, a second change speed gear coaxially secured to said fourth tubular shaft within said housing, a plurality of shafts rotatably mounted in said housing in spaced parallel relation to each other, and having certain shaft end portions projecting from said housing, said shafts including an input shaft and an output shaft, each of said tubular shafts having certain ones of said shafts extend coaxially therethrough in rotatable relation thereto, portions of said tubular shafts projecting from said housing, a forward directional clutch arranged exteriorly of said housing for connecting said first tubular shaft to said shaft which extends coaxially therethrough, a reverse directional clutch arranged exteriorly of said housing for connecting said second tubular shaft to said shaft which extends coaxially therethrough, a pair of speed controlling clutches arranged exteriorly of said housing for connecting said third and fourth tubular shafts to said respective shafts which extend coaxially therethrough, other change speed gearing coaxially and non-rotatably secured to certain of said shafts in constant meshing relation with said change speed gears which are coaxially secured to said third and fourth tubular shafts, driving connections between said forward directional gear, said reverse directional gear, and said change speed gears, said forward and reverse directional clutches arranged for alternately effecting forward and reverse drive of said output shaft through said change speed gears, and said speed controlling clutches arranged to effect drive of said output shaft at different selected speeds in either of the selected directions through said change speed gears.*

*23. In a transmission mechanism having a plurality of speeds in both forward and reverse direction the combination comprising a transmission housing, a first tubular shaft, a second tubular shaft axially aligned with said first tubular shaft, a third tubular shaft, a fourth tubular shaft*

*axially aligned with said third tubular shaft, said third and fourth tubular shafts being arranged parallel with said first and second tubular shafts, first shafting extending axially through said first and second tubular shafts, second shafting extending axially through said third and fourth tubular shafts, each of said shafts and said shafting extending therethrough having end portions projecting from said housing, directional clutches arranged exteriorly of said housing for connecting said first tubular shaft to said first shafting and said third tubular shaft to said second shafting, directional gears coaxially secured to said first and third tubular shafts, said directional gears arranged in meshing relation with each other so that said first and third tubular shafts are arranged to rotate in opposite directions, change speed gears coaxially secured to said second and fourth tubular shafts, speed controlling clutches arranged exteriorly of said housing for connecting said second tubular shaft to said first shafting and said fourth tubular shaft to said second shafting, other change speed gearing arranged in said housing in constant mesh with said change speed gearing secured to said tubular shafts, said directional clutches arranged for alternately effecting forward and reversed drive through said change speed gearing, and said speed controlling clutches arranged to effect drive at different selected speeds in either of the selected directions through said change speed gearing.*

*24. In a constant mesh transmission having three speeds in both forward and reverse direction the combination comprising a transmission housing having a first wall and a second wall, said walls each having three aligned apertures therethrough providing three parallel shaft centers, a first tubular shaft rotatably mounted in one of said housing first wall apertures, a second tubular shaft rotatably mounted in one of said housing second wall apertures in axial alignment with said first named tubular shaft, a forward directional gear coaxially secured to said first tubular shaft within said housing, a first change speed gear coaxially secured to said second tubular shaft within said housing, a third tubular shaft rotatably mounted in one of said housing first wall apertures in parallel relation to said other tubular shafts, a reverse directional gear coaxially secured to said third tubular shaft within said housing, a fourth tubular shaft rotatably mounted in one of said second wall apertures in axial alignment with said third tubular shaft, a second change speed gear coaxially secured to said fourth tubular shaft within said housing, a fifth tubular shaft rotatably secured in the remaining aperture in said housing first wall, a third change speed gear coaxially secured to said fifth tubular shaft within said housing, a first shafting rotatably positioned within said housing and extending axially through said first and second tubular shafts, said first shafting being rotatable relative to said first and second tubular shafts, a second shafting rotatably positioned within said housing in parallel relation to said first shafting and extending through said third and fourth tubular shafts, said second shafting being rotatable relative to said third and fourth tubular shafts, a third shafting positioned within said housing in parallel relation to said other shafting and having one end portion extending through said fifth tubular shaft, each of said tubular shafts and said shafting extending therethrough having end portions projecting from said housing, a forward directional clutch arranged exteriorly of said housing for connecting said first tubular shaft to said first shafting, a reverse directional clutch arranged exteriorly of said housing for connecting said third tubular shaft to said second shafting, and a plurality of speed controlling clutches arranged exteriorly of said housing for connecting said second, fourth and fifth tubular shafts to said first, second and third shafting respectively, other change speed gearing coaxially secured to said shafting within said housing in constant mesh with said change speed gears secured to said tubular shafts, said directional gears arranged in meshing relation with each other so that said first and third tubular shafts are arranged to rotate in opposite directions, said forward and reverse directional clutches arranged for alternately effecting forward and reverse drive of said third shafting through said change speed gearing, and said speed controlling clutches arranged to effect drive of said third shafting at three different selected speeds in either of the selected directions through said change speed gearing.*

*25. In a transmission mechanism, the combination comprising change speed gearing having its gears always in mesh, directional gearing providing a plurality of speeds in forward and reverse direction through said change speed gearing, fluid operated directional clutches, a plurality of fluid operated speed controlling clutches associated with certain of said change speed gears for effecting drive at different speeds through said change speed gearing, first valve means associated with said speed controlling clutches for controlling fluid flow to said respective fluid operated speed controlling clutch, manually operated control means for actuating said first valve means, speed responsive control means associated with said change speed gearing and operable to automatically actuate certain of said valve means upon change in speed of said transmission, second valve means associated with said fluid operated directional clutches for controlling flow to said respective fluid operated directional clutch, and other control means for alternately actuating said directional clutches.*

*26. In a reversible transmission mechanism having a plurality of speeds in both directions, the combination comprising a transmission housing, constant mesh gearing arranged within said housing, said gearing including separate directional gears and separate change speed gears, parallel shaftings journaled within said housing and arranged coaxial with certain of said gearing, a pair of directional clutches arranged coaxial with said parallel shaftings and associated with said directional gears, and a pair of change speed clutches arranged coaxially with said parallel shaftings and associated with said change speed gears, said directional clutches adapted upon engagement to regulate the direction of rotation of said parallel shaftings to alternately provide forward and reverse drive to said shaftings and said change speed gears, said change speed clutches adapted to selectively effect drive through the associated change speed gears at different predetermined speeds.*

*27. In a reversible transmission mechanism having a plurality of speeds in both directions the combination comprising a transmission housing, constant mesh gearing arranged within said housing, said gearing including separate directional gears and separate change speed gears, a pair of parallel shaftings journaled within said housing and arranged coaxial with certain of said gearing, a pair of directional clutches and a pair of change speed clutches arranged exteriorly of said housing, said pair of directional clutches arranged coaxial with said pair of parallel shaftings in operative association with said directional gears, said pair of change speed clutches arranged coaxially with said pair of parallel shaftings in operative association with said change speed gears, said directional clutches adapted upon engagement to regulate the direction of rotation of said pair of parallel shaftings and to alternately provide forward and reverse drive to said pair of shaftings and said change speed gears, and said change speed clutches adapted to selectively effect drive through the associated change speed gears at different predetermined speeds.*

*28. In a reversible transmission mechanism having a plurality of speeds in both directions, the combination comprising a transmission housing, a pair of parallel shaftings rotatably mounted in said housing, constant mesh gearing arranged in said housing, said gearing including separate directional gears and separate change speed gears, each of said shaftings having a directional gear and a change speed gear arranged coaxially thereon and rotat-*

*able relative thereto, a pair of directional clutches arranged coaxially with said parallel shaftings in operative association with said directional gears, and a pair of change speed clutches arranged coaxially with said parallel shaftings and associated with said change speed gears, said directional clutches adapted upon engagement to frictionally secure said directional gear to said respective coaxial shafting to regulate the direction of rotation of said pair of parallel shaftings to alternately provide forward and reverse drive to said pair of shaftings, and said change speed clutches adapted upon engagement to frictionally secure said change speed gear to said respective coaxial shafting to selectively effect drive through the associated change speed gears at different predetermined speeds.*

References Cited in the file of this patent or the original patent

UNITED STATES PATENTS

| | | |
|---|---|---|
| 1,979,488 | Perez | Nov. 6, 1934 |
| 2,080,067 | Stucatur | May 11, 1937 |
| 2,181,471 | Velo | Nov. 28, 1939 |
| 2,205,300 | Marsh | June 18, 1940 |
| 2,247,714 | Peterson et al. | July 1, 1941 |
| 2,304,032 | Schmitter | Dec. 1, 1942 |
| 2,333,682 | Schneider | Nov. 9, 1943 |
| 2,461,218 | Lapsley | Feb. 8, 1949 |
| 2,511,039 | Black et al. | June 13, 1950 |
| 2,553,376 | LeTourneau | May 15, 1951 |